US012358631B2

(12) United States Patent
Belleville

(10) Patent No.: US 12,358,631 B2
(45) Date of Patent: Jul. 15, 2025

(54) AIRCRAFT THERMAL ANTI-ICING SYSTEM

(71) Applicant: Pratt & Whitney Canada Corp., Longueuil (CA)

(72) Inventor: Francois Belleville, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 76 days.

(21) Appl. No.: 18/080,514

(22) Filed: Dec. 13, 2022

(65) Prior Publication Data

US 2024/0190573 A1 Jun. 13, 2024

(51) Int. Cl.
*B64D 15/04* (2006.01)
*B64D 29/00* (2006.01)
*B64D 33/02* (2006.01)
*B64D 33/08* (2006.01)
*B64D 27/24* (2006.01)

(52) U.S. Cl.
CPC .............. *B64D 15/04* (2013.01); *B64D 29/00* (2013.01); *B64D 33/02* (2013.01); *B64D 33/08* (2013.01); *B64D 27/24* (2013.01); *B64D 2033/0233* (2013.01)

(58) Field of Classification Search
CPC ................................. B64D 15/04; B64D 15/02
See application file for complete search history.

(56) References Cited

U.S. PATENT DOCUMENTS

| 2,264,297 | A | 12/1941 | Clay |
| 9,429,072 | B2 | 8/2016 | Diaz |
| 9,764,847 | B2 | 9/2017 | Wright |
| 10,759,539 | B2 * | 9/2020 | Knapp ...................... F02C 7/14 |
| 11,203,437 | B2 | 12/2021 | Epp |
| 11,619,170 | B1 * | 4/2023 | Dierksmeier ........... F02C 7/185 60/806 |
| 2005/0150204 | A1 | 7/2005 | Stretton |
| 2014/0369812 | A1 | 12/2014 | Caruel |

(Continued)

FOREIGN PATENT DOCUMENTS

GB        506179 A        5/1939

OTHER PUBLICATIONS

EP Search Report for EP Patent Application No. 23216430.1 dated Apr. 19, 2024.

*Primary Examiner* — Christopher P Ellis
*Assistant Examiner* — Terri L Filosi
(74) *Attorney, Agent, or Firm* — Getz Balich LLC

(57) ABSTRACT

An aircraft system is provided that includes a propulsor rotor, a powerplant, a cooling system, an anti-icing system and an aircraft structure. The powerplant is operatively and rotatably coupled to the propulsor rotor. The cooling system includes a cooling circuit and an air duct. The cooling circuit is thermally coupled with the powerplant to extract heat energy from the powerplant. The cooling circuit is thermally coupled with air flowing within the air duct to transfer the heat energy into the air and provide heated air. The anti-icing system includes an inlet fluidly coupled with the air duct. The anti-icing system is adapted to bleed some of the heated air from the air duct through the inlet to provide bleed air. The aircraft structure includes an exterior surface. The anti-icing system is adapted to direct the bleed air into the aircraft structure to heat the exterior surface.

20 Claims, 3 Drawing Sheets

(56) References Cited

U.S. PATENT DOCUMENTS

2015/0291284 A1    10/2015  Jared
2020/0277062 A1*   9/2020   Becker .................. B64D 27/24
2023/0358166 A1*   11/2023  Veilleux, Jr. .............. F02C 3/10

* cited by examiner

AIRCRAFT THERMAL ANTI-ICING SYSTEM

TECHNICAL FIELD

This disclosure relates generally to an aircraft and, more particularly, to a thermal anti-icing system for the aircraft.

BACKGROUND INFORMATION

An aircraft may include a thermal anti-icing system for melting and/or preventing accumulation of ice on an exterior (e.g., leading edge) surface of the aircraft. Various types and configurations of thermal anti-icing systems are known in the art. While these known thermal anti-icing systems have various benefits, there is still room in the art for improvement.

SUMMARY

According to an aspect of the present disclosure, an aircraft system is provided that includes a propulsor rotor, a powerplant, a cooling system, an anti-icing system and an aircraft structure. The powerplant is operatively and rotatably coupled to the propulsor rotor. The cooling system includes a cooling circuit and an air duct. The cooling circuit is thermally coupled with the powerplant to extract heat energy from the powerplant. The cooling circuit is thermally coupled with air flowing within the air duct to transfer the heat energy into the air and provide heated air. The anti-icing system includes an inlet fluidly coupled with the air duct. The anti-icing system is adapted to bleed some of the heated air from the air duct through the inlet to provide bleed air. The aircraft structure includes an exterior surface. The anti-icing system is adapted to direct the bleed air into the aircraft structure to heat the exterior surface.

According to another aspect of the present disclosure, another aircraft system is provided that includes a propulsor rotor, a powerplant, a cooling system, an anti-icing system and an aircraft structure. The powerplant is configured to drive rotation of the propulsor rotor. The cooling system includes a cooling circuit and an air duct. The cooling circuit is configured to extract heat energy from the powerplant and transfer the heat energy into air flowing within the air duct to provide heated air. The anti-icing system is configured to bleed some of the heated air from the air duct through an inlet to provide bleed air. The aircraft structure includes an exterior surface. The anti-icing system is configured to direct the bleed air into the aircraft structure to heat the exterior surface.

According to another aspect of the present disclosure, another aircraft system is provided that includes a propulsor rotor, a powerplant, a cooling system, an aircraft structure and an anti-icing system. The powerplant is configured to drive rotation of the propulsor rotor. The cooling system includes a cooling circuit and an air duct. The cooling circuit is configured to transfer heat energy from the powerplant into a liquid working fluid. The cooling circuit is configured to transfer the heat energy received by the liquid working fluid into air flowing within the air duct to provide heated air. The aircraft structure includes an exterior surface. The anti-icing system is configured to direct at least some of the heated air into the aircraft structure to heat the exterior surface.

According to still another aspect of the present disclosure, another aircraft system is provided that includes a propulsor rotor, a powerplant, a cooling system, an aircraft structure and an anti-icing system. The powerplant is configured to drive rotation of the propulsor rotor. The powerplant includes a thermal engine and an exhaust duct configured to exhaust combustion products generated by the thermal engine out of the powerplant. The cooling system includes a cooling circuit and an air duct. The cooling circuit is configured to extract heat energy from the thermal engine and transfer the heat energy into air flowing within the air duct to provide heated air. The aircraft structure includes an exterior surface. The anti-icing system is configured to direct at least some of the heated air into the aircraft structure to heat the exterior surface.

The liquid working fluid may be configured as or otherwise include lubricant.

The aircraft structure may be remote from the powerplant.

The aircraft system may also include a fan downstream of the inlet and configured to propel the bleed air into the aircraft structure.

The aircraft system may also include a louver arranged at the inlet and configured to direct the heated air from the air duct into the inlet.

The aircraft system may also include: means for propelling the bleed air into the aircraft structure; and/or means for directing the heated air from the air duct into the inlet. The air duct may be outside of the powerplant.

The aircraft structure may be an aircraft wing. The exterior surface may form a leading edge of the aircraft wing.

The bleed air may be exhausted form the aircraft wing at a tip of the aircraft wing.

The bleed air may be exhausted form the aircraft wing at a trailing edge of the aircraft wing.

The aircraft structure may be an aircraft wing. The anti-icing system may be configured to direct the bleed air along a leading edge of the aircraft wing to heat the exterior surface.

The aircraft structure may include a nacelle housing the powerplant. An inlet nose lip of the nacelle may include the exterior surface.

The aircraft structure may include a nacelle housing the powerplant. The anti-icing system may be configured to direct the bleed air along an inlet nose lip of the nacelle to heat the exterior surface.

The cooling circuit may flow lubricant for the powerplant.

The cooling circuit may flow fuel for the powerplant.

The cooling circuit may flow a cooling fluid for the powerplant.

The powerplant may be configured as or otherwise include a thermal engine.

The powerplant may be configured as or otherwise include a gas turbine engine.

The powerplant may be configured as or otherwise include an electric motor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
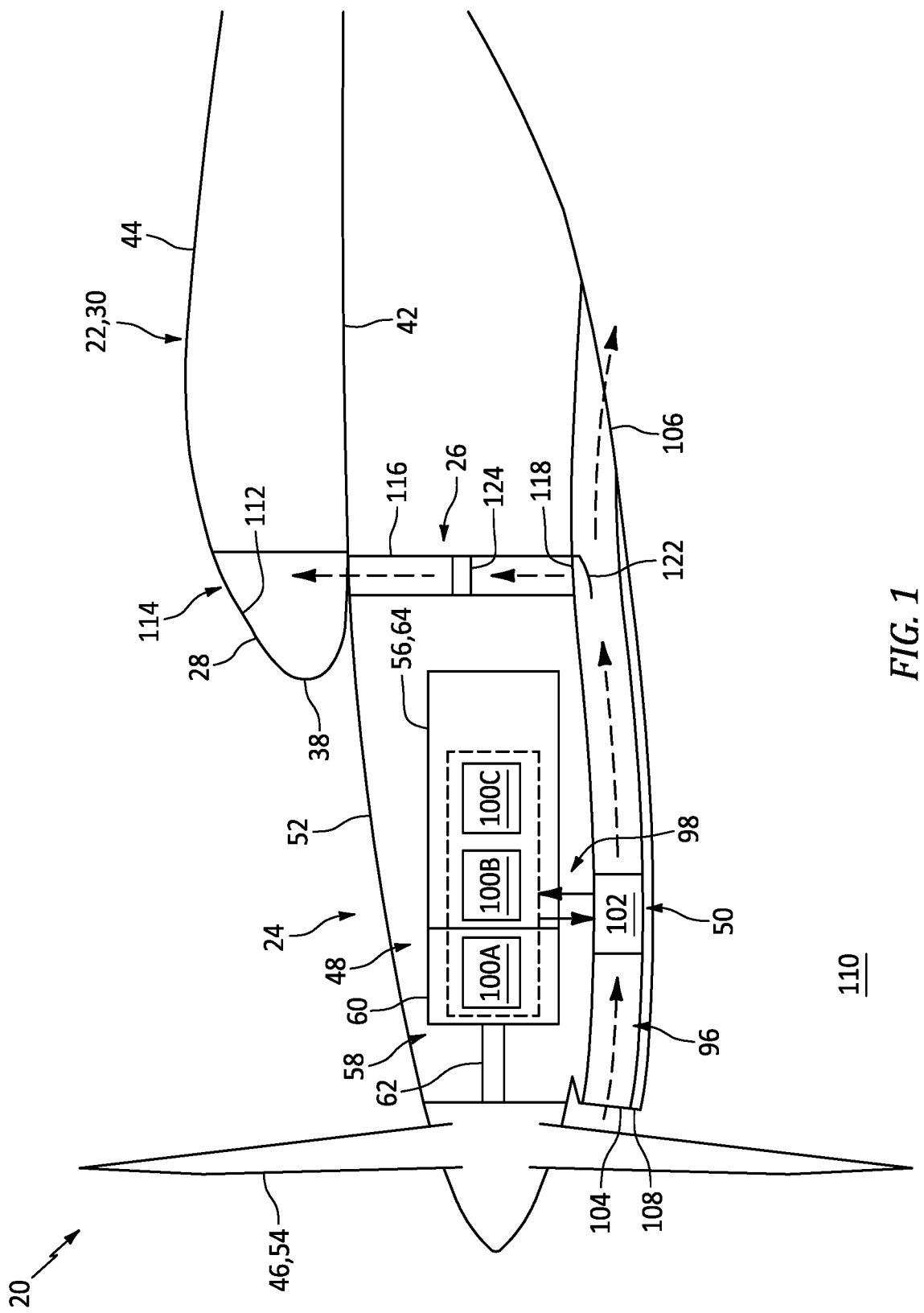
FIG. 1 is a partial side schematic illustration of an aircraft system.

FIG. 1 illustrates a system 20 for an aircraft such as an airplane. The aircraft system 20 includes an airframe structure 22 and an aircraft propulsion system 24 mounted to the airframe structure 22. The aircraft system 20 also includes a thermal anti-icing system 26 configured to melt and/or prevent ice accumulation on an exterior surface 28 of the airframe structure 22.

Figure 2:
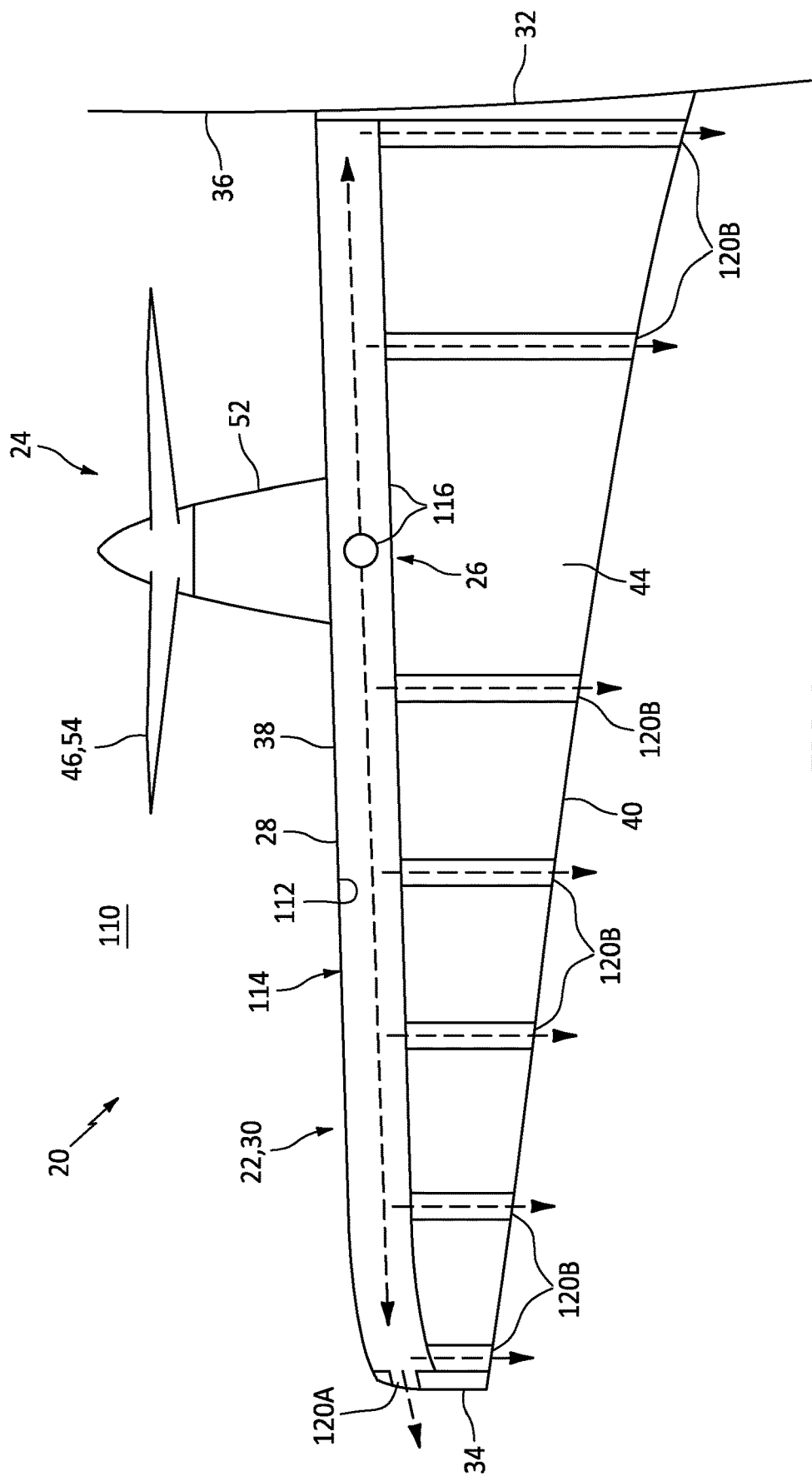
FIG. 2 is a partial top view schematic illustration of the aircraft system.

The airframe structure 22 may be configured as or otherwise include a wing 30 of the aircraft. Referring to FIG. 2, the aircraft wing 30 extends spanwise along a span line from a base 32 of the aircraft wing 30 to a tip 34 of the aircraft wing 30. This aircraft wing 30 of FIG. 2 is connected to a fuselage 36 of the aircraft at its wing base 32. The aircraft wing 30 extends longitudinally (e.g., along a camber line) from a leading edge 38 of the aircraft wing 30 to a trailing edge 40 of the aircraft wing 30. Referring to FIG. 1, the aircraft wing 30 has a thickness that extends vertically between and to a bottom side 42 of the aircraft wing 30 and a top side 44 of the aircraft wing 30. Referring to FIGS. 1 and 2, each wing side 42, 44 extends spanwise from the wing base 32 to the wing tip 34. Each wing side 42, 44 extends longitudinally between the leading edge 38 and the trailing edge 40, where the wing sides 42 and 44 may meet at the leading edge 38 and the trailing edge 40.

Referring to FIG. 1, the aircraft propulsion system 24 includes a propulsor rotor 46, a powerplant 48 and a powerplant cooling system 50. The aircraft propulsion system 24 also includes a nacelle 52 housing and providing an aerodynamic cover over the powerplant 48 and the cooling system 50. The nacelle 52 of FIG. 1 may also house and provide an aerodynamic cover over at least a portion of the anti-icing system 26.

The propulsor rotor 46 may be configured as or otherwise include a bladed rotor. This propulsor rotor 46 may be an open rotor (e.g., an un-ducted rotor) such as a propeller rotor 54 for a propeller propulsion system; e.g., a turboprop engine. Other examples of the open rotor include a propulsor rotor for a propfan propulsion system or a propulsor rotor for a pusher fan propulsion system. The present disclosure, however, is not limited to open rotor propulsion systems. The propulsor rotor 46, for example, may alternative be a ducted rotor such as a fan rotor (e.g., a fan) for a turbofan propulsion system; e.g., a turbofan engine. It is further contemplated the propulsor rotor 46 may be configured as another type of air mover. However, for ease of description, the propulsor rotor 46 may be described below as the propeller rotor 54.

The powerplant 48 is configured to drive rotation of the propulsor rotor 46. The powerplant 48 of FIG. 1, for example, includes a drive unit 56 and a drivetrain 58 operatively connecting the drive unit 56 to the propulsor rotor 46. This drivetrain 58 may be configured as a geared drivetrain. The drivetrain 58 of FIG. 1, for example, includes a geartrain 60 (e.g., a reduction gear system) and a shaft 62 or another power transmission device coupling an output of the geartrain 60 to the propulsor rotor 46. The present disclosure, however, is not limited to such an exemplary arrangement. Furthermore, in other embodiments, the geartrain 60 may be omitted from the drivetrain 58 to provide a direct drive coupling between the drive unit 56 and the propulsor rotor 46.

The drive unit 56 may be configured as or otherwise include a thermal engine. Examples of the thermal engine include, but are not limited to, a gas turbine engine 64, a reciprocating piston engine and a rotary engine. The drive unit 56 may alternatively be configured as or also include an electric motor and/or a fuel cell. The present disclosure, however, is not limited to the foregoing exemplary drive unit configurations. The drive unit 56, for example, may be configured as or otherwise include any apparatus capable of driving rotation of the propulsor rotor 46 as well as generating heat energy during its operation. However, for ease of description, the drive unit 56 may be described below as the gas turbine engine 64.

Figure 3:
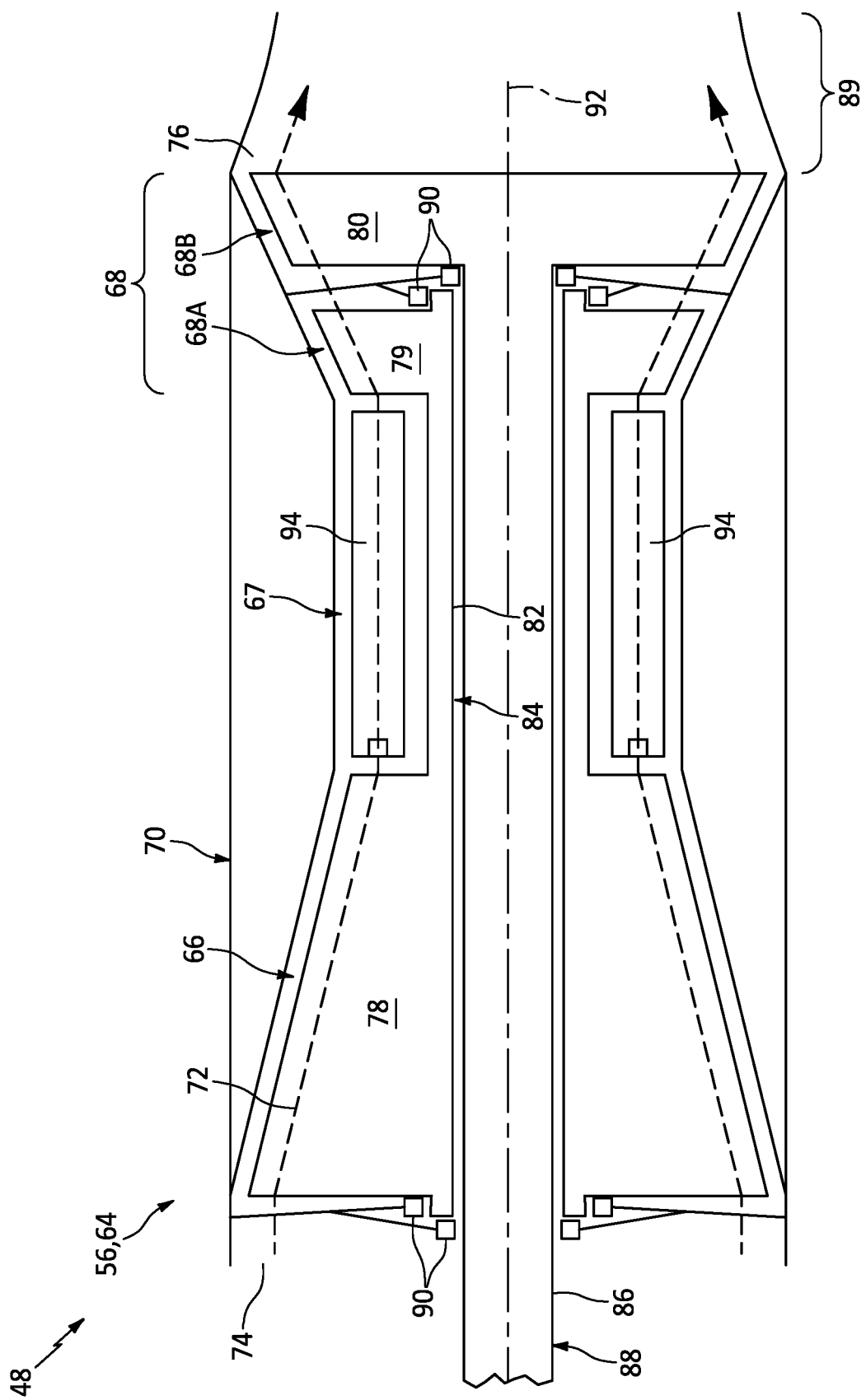
FIG. 3 is a side schematic illustration of a gas turbine engine and an exhaust duct.

Referring to FIG. 3, the gas turbine engine 64 includes a compressor section 66, a combustor section 67 and a turbine section 68. The turbine section 68 may include a high pressure turbine (HPT) section 68A and a low pressure turbine (LPT) section 68B; e.g., a power turbine section. The gas turbine engine 64 also includes an engine case 70 housing the engine sections 66-68B.

The compressor section 66, the combustor section 67, the HPT section 68A and the LPT section 68B are arranged sequentially along a core flowpath 72 within the gas turbine engine 64. This core flowpath 72 extends within the gas turbine engine 64 from an upstream airflow inlet 74 into the gas turbine engine 64 to a downstream combustion products exhaust 76 from the gas turbine engine 64.

Each of the engine sections 66, 68A and 68B includes a respective bladed rotor 78-80. Each of these bladed rotors 78-80 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 78 is connected to the HPT rotor 79 through a high speed shaft 82. At least the compressor rotor 78, the HPT rotor 79 and the high speed shaft 82 may collectively form a high speed rotating structure 84 of the gas turbine engine 64. The LPT rotor 80 is connected to a low speed shaft 86, which low speed shaft 86 may extend axially through a bore of the high speed rotating structure 84 and its high speed shaft 82. At least the LPT rotor 80 and the low speed shaft 86 may collectively form a low speed rotating structure 88 of the gas turbine engine 64. This low speed rotating structure 88 may be coupled to and rotatable with the propulsor rotor 46 of FIG. 1 through the drivetrain 58 and its members(s) 60 and/or 62. The present disclosure, however, is not limited to such a geared coupling between the powerplant 48 and the propulsor rotor 46. The powerplant 48, for example, may alternatively be operatively connected to the propulsor rotor 46 without a geartrain; e.g., via a direct drive drivetrain.

The rotating structures 84 and 88 and their shafts 82 and 86 of FIG. 3 are supported by a plurality of bearings 90. Each of these bearings 90 is connected to the engine case 70 by one or more support structures; e.g., struts, frames, etc. With this arrangement, each of the rotating structures 84, 88 of FIG. 3 is rotatable about an axial centerline 92 (e.g., a rotational axis) of the gas turbine engine 64.

During gas turbine engine operation, air enters the core flowpath 72 through the airflow inlet 74 and is directed into the compressor section 66. The air within the core flowpath 72 may be referred to as "core air". This core air is compressed by the compressor rotor 78 and directed into a combustion chamber 94 of a combustor within the combustor section 67. The fuel is injected into the combustion chamber 94 by one or more fuel injectors and mixed with the compressed air to provide a fuel-air mixture. This fuel-air mixture is ignited and combustion products thereof flow through and sequentially cause the HPT rotor 79 and the LPT rotor 80 to rotate. The rotation of the HPT rotor 79 drives rotation of the compressor rotor 78 and, thus, compression of the air received from the airflow inlet 74. The rotation of the LPT rotor 80 and, more generally, the low speed rotating structure 88 provides mechanical power for driving (e.g., rotating) the propulsor rotor 46 of FIG. 1. The combustion products may then be exhausted from the aircraft propulsion system 24 through an exhaust duct 89. The present disclosure, however, is not limited to such an exemplary gas turbine engine configuration. For example, in other embodiments, the low speed rotating structure 88 may also include a compressor rotor. In still other embodiments, the low speed rotating structure 88 may be omitted and the high speed rotating structure 84 may be configured for providing the mechanical power for driving the propulsor rotor 46 of FIG. 1.

The powerplant 48 generates heat energy during its operation. This heat energy may be generated by frictional contact between internal components of the geartrain 60 of FIG. 1; e.g., gears, bearings, shafts, etc. Referring to FIG. 3, the heat energy may be generated by frictional contact between components of one or more of the bearings 90. The heat energy may be generated by compression of the core air within the compressor section 66. The heat energy may be generated by combustion of the fuel-air mixture within the combustion chamber 94. The heat energy may also or alternatively be generated by and/or within various other components, structures and/or sections of the powerplant 48 and its members 56 and/or 58.

The cooling system 50 of FIG. 1 is configured to extract at least some of the heat energy from the powerplant 48 and one or more of its members 56 and/or 58 to cool the powerplant 48 and its member(s) 56 and/or 58 using a working fluid. Briefly, this working fluid may be any fluid (e.g., liquid and/or gas) used within the powerplant 48. The working fluid, for example, may be lubricant, coolant and/or fuel. The cooling system 50 includes an air duct 96 and a cooling circuit 98. The cooling circuit 98 of FIG. 1 includes one or more powerplant heat exchangers 100A-C (generally referred to as "100"), a duct heat exchanger 102 and the working fluid.

The air duct 96 may be disposed outside of the powerplant 48. The air duct 96 of FIG. 1, for example, is disposed vertically below the powerplant 48 and its drive unit 56; e.g., the gas turbine engine 64. The air duct 96 extends within the nacelle 52 between and to an airflow inlet 104 into the air duct 96 and an airflow exhaust 106 from the air duct 96. The airflow inlet 104 may be formed by an inlet nose lip 108 of the nacelle 52. This nose lip 108 is configured to direct ambient air from an environment 110 external to the aircraft propulsion system 24 into the air duct 96. The airflow exhaust 106, on the other hand, is configured to exhaust air from within the air duct 96 out of the aircraft propulsion system 24 into the external environment 110. The air duct 96 may be configured as a bypass duct such that the air flowing within the air duct 96 bypasses (e.g., does not enter, is not received from, etc.) the powerplant 48 and its drive unit 56; e.g., the core flowpath 72 within the gas turbine engine 64 of FIG. 3. It is contemplated, however, that some of the air within the air duct 96 may alternatively be split off and directed to the powerplant 48 and its drive unit 56 (e.g., into the airflow inlet 74 of the gas turbine engine 64 of FIG. 3) in other embodiments.

Each powerplant heat exchanger 100 is arranged with the powerplant 48. At least one of the powerplant heat exchangers (e.g., 100A), for example, may be arranged with the drivetrain 58; e.g., the geartrain 60. One or more of the powerplant heat exchangers (e.g., 100B and 100C) may also or alternatively be arranged with the drive unit 56; e.g., the gas turbine engine 64. Each powerplant heat exchanger 100 is configured to transfer heat energy out of a respective powerplant component (or components) generating the heat energy and/or otherwise exposed to the heat energy. Each powerplant heat exchanger 100, for example, may be thermally coupled to the respective component(s) or integrated as part of the respective component(s). Each powerplant heat exchanger 100 may thereby transfer the heat energy out of the respective powerplant component (or components) and into the working fluid.

The duct heat exchanger 102 is arranged with the air duct 96. The duct heat exchanger 102 of FIG. 1, for example, is disposed within the air duct 96. The duct heat exchanger 102, in particular, may extend laterally across an internal flowpath of the air duct 96. The duct heat exchanger 102 is configured to transfer the thermal energy, added to the working fluid by the powerplant heat exchangers 100, into air flowing within the air duct 96 through and/or around the duct heat exchanger 102. The cooling circuit 98 may thereby cool the respective powerplant component (or components) using the powerplant heat exchangers 100, and heat the air flowing within the air duct 96 using the duct heat exchanger 102 to provide heated air.

The anti-icing system 26 is configured to utilize heat energy extracted (e.g., rejected) from the powerplant 48 during the powerplant cooling for heating the exterior surface 28. More particularly, the anti-icing system 26 is configured to bleed some of the heated air from the air duct 96 and direct that heated air into the airframe structure 22 (e.g., the aircraft wing 30) for heating a backside 112 (e.g., an interior) of a skin 114 forming the exterior surface 28. The anti-icing system 26 of FIG. 1, for example, includes an anti-icing duct 116. This anti-icing duct 116 includes a bleed inlet 118 along the air duct 96 (e.g., in a sidewall of the air duct 96) between the duct heat exchanger 102 and the airflow exhaust 106. The anti-icing duct 116 extends from its bleed inlet 118 within the nacelle 52 and into the aircraft wing 30 (e.g., the airframe structure 22). Referring to FIG. 2, within the aircraft wing 30, the anti-icing duct 116 is disposed at and may extend spanwise along at least a portion or an entirety of the leading edge 38. With this arrangement, the heated air may heat the wing skin 114 at the leading edge 38 and thereby melt and/or prevent ice accumulation along the leading edge 38.

After the heated air is directed past an area of interest (e.g., the leading edge 38), the now cooler air may be exhausted from the anti-icing system 26 through one or more outlets 120A and 120B (generally referred to as "120"). At least one of the outlets (e.g., 120A, 120B) may be disposed at the wing tip 34. At least one of the outlets (e.g., 120B) may be disposed at the wing base 32. One or more of the outlets (e.g., 120B) may also or alternatively be disposed at and along the trailing edge 40.

In some embodiments, referring to FIG. 1, the anti-icing system 26 may include a louver 122 to facilitate bleeding of the heated air from the air duct 96. The louver 122 of FIG. 1, for example, is arranged at the bleed inlet 118 and configured to direct the heated air into the anti-icing duct 116 through the bleed inlet 118. This louver 122 may be a stationary element. Alternatively, the louver 122 may be moveable (e.g., pivotable) to regulate bleeding of the heated air from the air duct 96 into the anti-icing duct 116.

In some embodiments, referring to FIG. 1, the anti-icing system 26 may include a fan 124 to propel the heated bleed air into the airframe structure 22; e.g., the aircraft wing 30. The fan 124, for example, may be located within the anti-icing duct 116, downstream of the bleed inlet 118. This fan 124 may be (e.g., directly or indirectly) rotationally driven by an electric motor, a hydraulic motor or otherwise. The fan 124 may be operated (e.g., switched on) when, for example, a forward speed of the aircraft through the external environment 110 does not generate enough air pressure within the air duct 96 to propel the air bled from the air duct 96 through the anti-icing duct 116 and into the airframe structure 22. By contrast, when the forward speed of the aircraft through the external environment 110 does generate enough air pressure within the air duct 96 to propel the air bled from the air duct 96 through the anti-icing duct 116 and into the airframe structure 22, the fan 124 may be switched off; e.g., the fan 124 may not rotate/may be non-operational. Of course, it is contemplated the fan 124 may also or alternatively be used during other modes of operation; e.g., to boost air pressure.

The anti-icing system 26 is described above as delivering the heated air to a structure outside of/discrete from the nacelle 52 housing the powerplant 48. However, in other embodiments, the anti-icing system 26 may also or alternatively deliver the heated air to a portion of the nacelle 52. The anti-icing system 26, for example, may also or alternatively direct the heated air to an inlet nose lip that directs air to the drive unit 56 and its airflow inlet 74 (see FIG. 3) and/or the inlet nose lip 108. In still other embodiments, the anti-icing system 26 may also or alternatively deliver the heated air to any other structure of the aircraft which would benefit from melting and/or preventing ice accumulation thereon. The aircraft structure(s) may be remote from the powerplant 48 (e.g., discrete from the nacelle 52) and/or part of the nacelle 52.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft system, comprising:
an open propulsor rotor;
a powerplant operatively and rotatably coupled to the open propulsor rotor, the powerplant disposed aft of the open propulsor rotor;
a cooling system including a cooling circuit and an air duct, the cooling circuit thermally coupled with the powerplant to extract heat energy from the powerplant, the cooling circuit thermally coupled with air flowing within the air duct to transfer the heat energy into the air and provide heated air, and the air duct extending between an airflow inlet and an airflow exhaust;
an anti-icing system including an inlet fluidly coupled with the air duct, the anti-icing system adapted to bleed some of the heated air from the air duct through the inlet of the anti-icing system to provide bleed air, and the inlet of the anti-icing system disposed between the cooling circuit and the airflow exhaust; and
an aircraft structure comprising an exterior surface, the anti-icing system adapted to direct the bleed air into the aircraft structure to heat the exterior surface.

2. The aircraft system of claim 1, further comprising a fan downstream of the inlet and configured to propel the bleed air into the aircraft structure.

3. The aircraft system of claim 1, further comprising a louver arranged at the inlet and configured to direct the heated air from the air duct into the inlet.

4. The aircraft system of claim 1, further comprising:
means for propelling the bleed air into the aircraft structure; and
means for directing the heated air from the air duct into the inlet.

5. The aircraft system of claim 1, wherein the air duct is outside of the powerplant.

6. The aircraft system of claim 1, wherein
the aircraft structure is an aircraft wing; and
the exterior surface forms a leading edge of the aircraft wing.

7. The aircraft system of claim 6, wherein the bleed air is exhausted from the aircraft wing at a tip of the aircraft wing.

8. The aircraft system of claim 6, wherein the bleed air is exhausted from the aircraft wing at a trailing edge of the aircraft wing.

9. The aircraft system of claim 1, wherein
the aircraft structure is an aircraft wing; and
the anti-icing system is configured to direct the bleed air along a leading edge of the aircraft wing to heat the exterior surface.

10. The aircraft system of claim 1, wherein
the aircraft structure comprises a nacelle housing the powerplant; and
an inlet nose lip of the nacelle includes the exterior surface.

11. The aircraft system of claim 1, wherein
the aircraft structure comprises a nacelle housing the powerplant; and
the anti-icing system is configured to direct the bleed air along an inlet nose lip of the nacelle to heat the exterior surface.

12. The aircraft system of claim 1, wherein the cooling circuit flows lubricant for the powerplant.

13. The aircraft system of claim 1, wherein the cooling circuit flows fuel for the powerplant.

14. The aircraft system of claim 1, wherein the cooling circuit flows a cooling fluid for the powerplant.

15. The aircraft system of claim 1, wherein the powerplant comprises a thermal engine.

16. The aircraft system of claim 1, wherein the powerplant comprises an electric motor.

17. An aircraft system, comprising:
an un-ducted propulsor rotor;
a powerplant configured to drive rotation of the un-ducted propulsor rotor, the un-ducted propulsor rotor disposed forward of the powerplant;
a cooling system including a cooling circuit and an air duct, the cooling circuit configured to transfer heat energy from the powerplant into a liquid working fluid, the cooling circuit configured to transfer the heat energy received by the liquid working fluid into air flowing within the air duct to provide heated air, and the air duct extending from an airflow inlet towards an airflow exhaust;

an aircraft structure comprising an exterior surface; and an anti-icing system configured to direct at least some of the heated air into the aircraft structure to heat the exterior surface, the anti-icing system including an anti-icing duct disposed between the cooling circuit and the airflow exhaust.

18. The aircraft system of claim 17, wherein the liquid working fluid comprises lubricant.

19. The aircraft system of claim 17, wherein the aircraft structure is remote from the powerplant.

20. An aircraft system, comprising:

an open propulsor rotor;

a powerplant configured to drive rotation of the open propulsor rotor, the powerplant including a thermal engine and an exhaust duct configured to exhaust combustion products generated by the thermal engine out of the powerplant;

a cooling system including a cooling circuit and an air duct, the cooling circuit configured to extract heat energy from the thermal engine and transfer the heat energy into air flowing within the air duct to provide heated air, the air duct disposed outside of the powerplant and downstream of the open propulsor rotor, and the air duct including an airflow exhaust disposed downstream of the cooling circuit;

an aircraft structure comprising an exterior surface; and an anti-icing system configured to direct at least some of the heated air into the aircraft structure to heat the exterior surface, the anti-icing system including a bleed inlet disposed between the cooling circuit and the airflow exhaust.

* * * * *